Dec. 23, 1952     H. L. CAMPBELL     2,622,438
MOISTURE TESTER
Filed April 1, 1950     2 SHEETS—SHEET 1
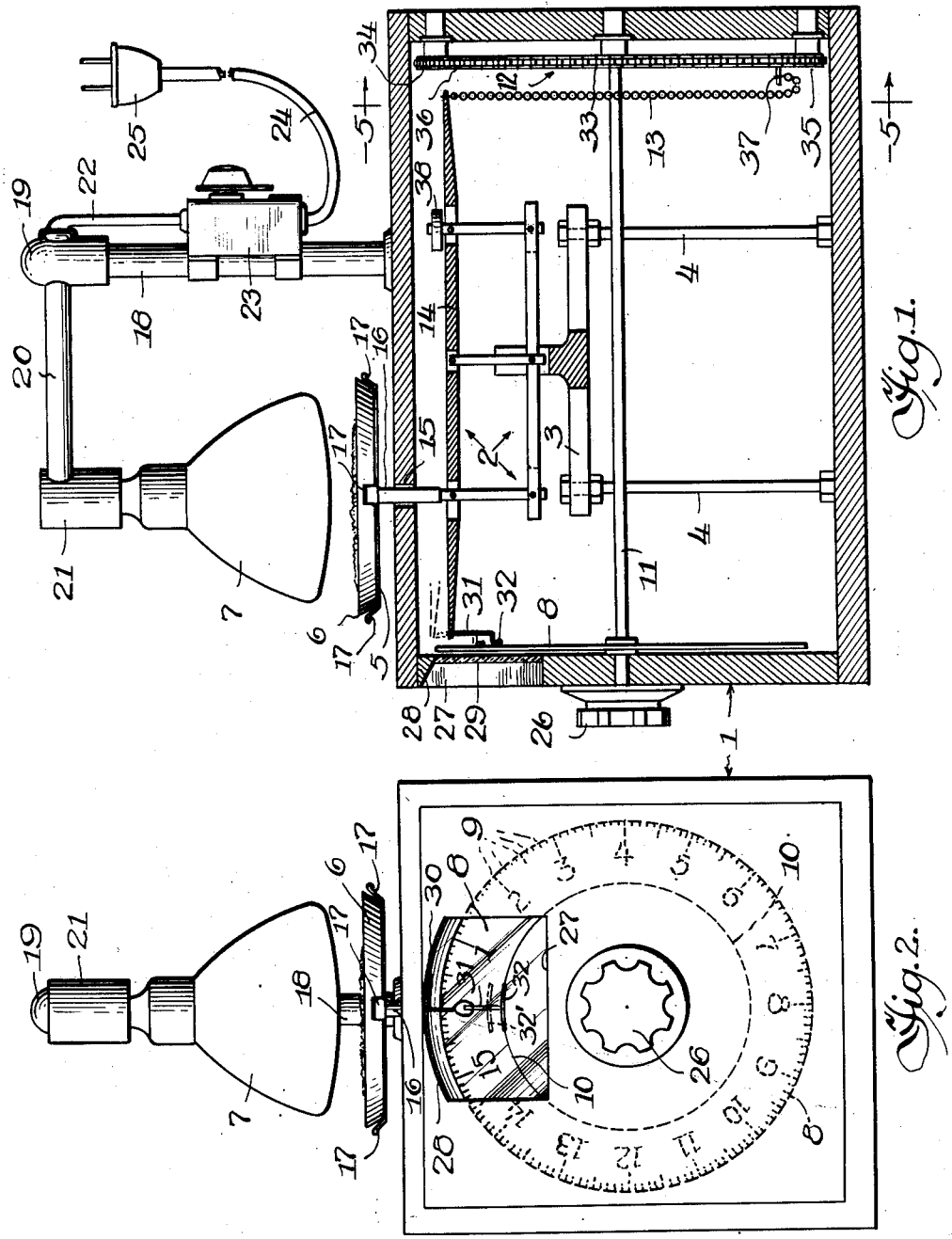
Inventor,
Harry L. Campbell
By Frederick F. Mason
Atty.

Dec. 23, 1952 H. L. CAMPBELL 2,622,438
MOISTURE TESTER
Filed April 1, 1950 2 SHEETS—SHEET 2
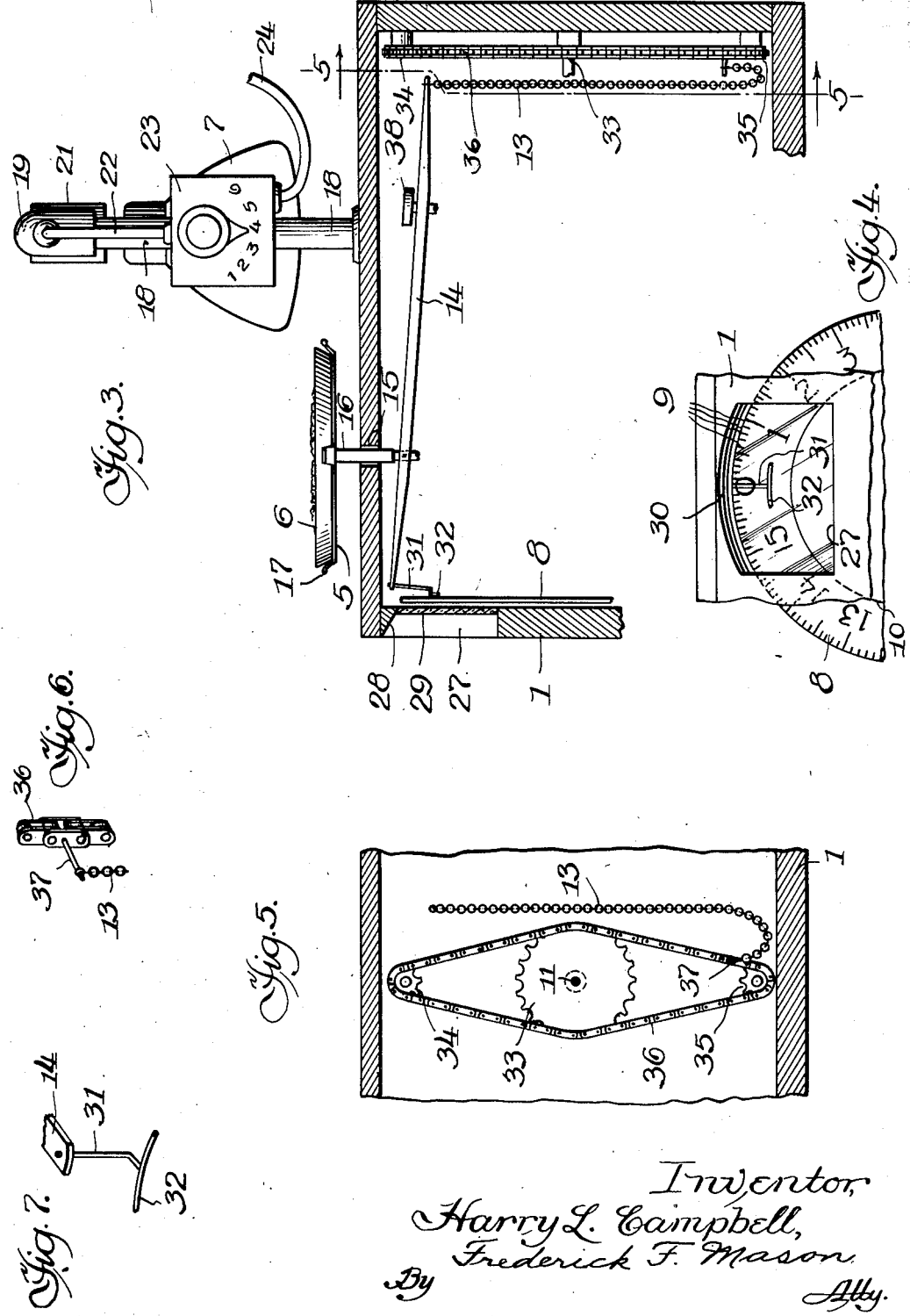
Inventor,
Harry L. Campbell,
Frederick F. Mason
By
Atty.

Patented Dec. 23, 1952

2,622,438

UNITED STATES PATENT OFFICE 2,622,438

MOISTURE TESTER

Harry L. Campbell, Oak Park, Ill., assignor to Claud S. Gordon Company, Chicago, Ill., a corporation of Illinois Application April 1, 1950, Serial No. 153,321

6 Claims. (Cl. 73—76)

This invention relates to a moisture tester, and more particularly to such device so constructed and arranged that the moist material to be tested is weighed and dried, and the amount of moisture driven off is, after suitable manipulation of a registering device, read off directly in percentage of such moisture. An important feature in the present invention is the use of a counter-weight to balance the major loads, and a flexible chain or the like to balance the variable minor loads within the range of the apparatus, and the ability to read the amounts of moisture driven off directly in percentages.

The original and standard method for determining the amount of moisture in granular materials, as practiced prior to the present invention, was to weigh out a definite amount of sample on an accurate balance, put the sample in an oven heated to a prescribed temperature for a sufficient length of time to remove the moisture, then cool out of contact with moist air, and weigh again on an accurate balance, and compute the percentage by calculation. In the old practice, if the sample were not cooled out of contact with moist air before the second weighing, some moisture would have been taken up by the sample from the air because of the time consuming procedure required.

With the moisture tester of the present invention, the procedure is so much more simple and rapid that the final reading of the percentage of moisture driven off can be directly read almost instantly after the moisture has been driven off from the sample, thus eliminating the danger of adsorption of moisture by the sample due to lapse of time, and providing a tester that is fool proof, can be carried from place to place where electricity is available, and operated by unskilled help to obtain quick and accurate results.

Among the objects of the present invention are: to provide a moisture tester that will overcome the disadvantages, and accomplish the advantages, referred to earlier herein; to provide a novel and improved moisture tester; to provide a moisture tester in which the sample of moist granular material may be weighed on the tester, dried in a short time, and the amount of moisture driven off may be quickly and easily read directly in percentage of moisture removed; to provide a moisture tester in which the sample of moist granular material may be weighed, dried, and the percentage of removed moisture directly read, while the sample remains in place on the tester; to provide a moisture tester having a balance, a counterweight to balance the major load and a flexible chain to balance the variable minor load; to provide a moisture tester having novel means for directly reading the amount of moisture driven off, in terms of percentages of moisture removed; to provide novel means for varying the effective weight of a chain on the balance and reading the amounts of moisture removed in percentages; to provide new means for drying the moist material on the tester; to provide a moisture tester that will quickly produce accurate results with an unskilled operator; to enclose the balance and all critical parts within a cabinet to enable the tester to be safely used in any part of the plant or shop by unskilled labor; and such further objects, advantages and capabilities, inherently possessed by my invention, as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is a longitudinal, vertical section, taken on a median plane, of my improved moisture tester, parts being shown in elevation for convenience and better understanding, and showing the pan containing a sample ready for drying and testing.

Fig. 2 is a front elevation looking toward the left hand side of Fig. 1.

Fig. 3 is a fragmentary, longitudinal, vertical section, some of the interior parts being omitted for convenience, and showing the sample pan empty, and the heater lamp swung to one side away from the pan.

Fig. 4 is a fragmentary, front elevation looking toward the front panel window through which the readings are read, and showing the pointer of the balance in the position shown in Fig. 3.

Fig. 5 is a fragmentary, vertical section on the line 5—5 of Fig. 3.

Fig. 6 is a fragmentary, perspective detail showing a small portion of the means for raising and lowering the flexible chain, and the connection therewith of the lower end of the flexible chain, for applying different increments of load to the balance.

Fig. 7 is a fragmentary, perspective detail, showing a small portion of the front end of the balance beam with the pointer member fixed thereto for movement upwardly and downwardly therewith.

In the form shown in the drawings, for illustrative purposes, my invention comprises in general, a cabinet 1 having top, bottom and side walls, a balance 2 mounted upon a support 3 spaced upwardly a suitable distance from the cabinet bottom wall by rods, columns or the like 4 of which any suitable number (preferably four) may be used as desired, a supporting plate 5 for receiving a pan 6 for sample material to be tested, a heat radiating lamp 7 swingably mounted on the cabinet top wall, a transparent disk 8 having around its marginal edge graduations 9 and at a distance inside of said marginal edge a concentric circle 10, and a shaft 11 journaled adjacent its ends in the cabinet front and rear walls, said shaft at its rear end having means 12 for raising and lowering the lower end of a flexible chain 13, said chain at its opposite end being connected with the rear end of the balance beam 14.

The balance 2 is merely shown diagrammatically, and while it may be of any suitable type, I prefer to use a torsion balance of a conventional type available commercially on the market. As no claims are made to the specific construction of the balance per se, other than its connection with the other parts of the present combination, it is deemed sufficient to show it more or less diagrammatically, for the purpose of the present application. One form of such torsion balance is available on the market as a regular commercial product of The Torsion Balance Company. Hence it will be hereinafter referred to generally as a balance, which is tiltably mounted on the support 3. Suitably articulated with balance 2, and extending upwardly therefrom through an opening 15 in the top wall of the cabinet to have free vertical movement therethrough as the balance is moved in one direction or the other during its operation, is a stem 16 having mounted on its upper end a horizontal supporting plate 5. Plate 5, at suitable intervals around its circumference, is formed with upstanding outwardly flared ears 17 of any suitable number, so that the pan 6 may be removably seated on plate 5 when desired.

Extending upwardly from the cabinet top wall, at a suitable distance to the rear of the pan plate 5, and preferably about midway of the width of the top wall, is a column 18 which may be either stationary or axially rotatable with relation to the cabinet top wall as desired. In Fig. 3 it has been shown as rotated through 90° with relation to the position shown in Fig. 1. Rotatably mounted on the top of column 18, or fixed thereto if the column is rotatable, is a cap member 19 having fixed thereto to extend laterally therefrom a tubular arm 20 to the outer end of which is fixed a downwardly extending socket member 21, into which is removably screwed the heat radiating lamp 7. The length of arm 20 is such that the vertical central axis of lamp 7, approximately passes through the center of pan 6 when swung thereover. This positions the bottom face of the lamp substantially centrally over the contents of the pan, which bottom face is positioned slightly above the top of the material in the pan so as to clear the same when swung thereover or away therefrom, and to give effective heat radiation to the pan and its contents. Heat bulb 7 may be of any suitable conventional type obtainable on the market, and which is so constructed as to direct the heat rays through the bottom of the bulb, as viewed in Fig. 1, directly toward the pan and its contents. While I do not wish to be limited thereto, I have had successful results with an infrared heat bulb of 250 watts and 115 volts.

Electric current is supplied to the bulb through wires in a cord 22, which passes through the hollow interior of cap member 19, tubular arm 20, and to the interior of socket member 21. A conventional automatic timing switch 23 is provided, which may be mounted on the column 18, or on any other suitable location on the cabinet, and which may be set in the usual manner for turning off the current to the bulb at the end of the time for which it may be set. As such automatic timing switches may be purchased on the market, it will be unnecessary to describe the same in greater detail, further than to state that the electric cord 22 leads into the timing switch, and connected with the switch is a supply cord 24, of any desired length, and provided at its free end with a plug 25 for connection with any convenient wall socket carrying a source of electricity. It is thus seen that the heat bulb may be swung over, and away from, the pan and its contents as desired, and the timing switch may be set to automatically cut off the current to the bulb after any length of time desired.

Shaft 11 extends a slight distance beyond the front wall of the cabinet and has fixed to said extending end a knob 26, which when rotated will rotate this shaft. Likewise, just inside the cabinet front wall, the disk 8 is fixed to shaft 11 to rotate therewith upon rotation of knob 26. Disk 8 is formed of a transparent material, such as glass, a transparent commercial plastic material, or the like, around the marginal edge of which are provided said graduations 9. Formed in the upper portion of the cabinet front wall is an opening 27, having an upper edge curved concentrically with disk 8, and provided with a strip 28 whose lower face is beveled outwardly and upwardly, and whose inner lower edge is approximately in registry with the outer edge of disk 8, as seen in Figs. 1 and 3. In order to prevent entry of dust into the cabinet, opening 27 is provided with a transparent window 29 of glass, commercial plastic material, or other suitable transparent material. Through window 29 the graduations 9 on disk 8 may be read, when the disk is rotated to present such graduations behind the window.

Fixed in, or on, the center of the lower face of beveled strip 28, to fall in the vertical center line passing through the center of knob 26, is an index line 30 the lower end of which is approximately on the level of, and close to, the marginal edge of disk 8, to serve as a marker for the graduations on the disk when reading the results of the operation of the tester. Also fixed on the disk 8, at a predetermined distance radially inwardly from the graduations 9, is the circular line 10, which is concentric with the axis of shaft 11. Depending from the front end of the balance beam 14, and fixed thereto, is a wire 31 (see Fig. 7) the bottom end portion of which is bent at right angles forwardly and to the front end of which is fixed a lateral pointer wire 32, curved on a radius equal to that of the circle 10, to indicate the points of balance when the pointer 32 coincides with circle 10. As stated, the graduations are observed through the window 29.

Fixed to the rear end portion of shaft 11 to rotate therewith, adjacent the cabinet rear wall, is a sprocket wheel 33, and journaled to the rear wall above and below wheel 33, are the smaller top and bottom sprocket wheels 34 and 35 respectively (see Fig. 5). Running over the teeth of the sprocket wheels 33—35 is a sprocket chain 36 to be moved as the shaft 11 rotates in one direction or the other. Extending laterally from a predetermined one of the links of sprocket chain 36 is a pin 37 (see Figs. 1 and 6), to the outer end of which is connected the lower end of said small flexible chain 13, which, as stated herein, is connected at its upper end with the rear end of balance beam 14.

Removably mounted on the rear portion of the balance, at a predetermined point, is a counterweight 38. For illustrative purposes in the tester apparatus described herein, certain values have been given, but it will be understood that the values and proportions may be changed in different machines without departing from the spirit of the invention, the main requirement being that the graduations 9 represent percentages of moisture driven off. In the machine described herein, the counter-weight 38 is 42.5 grams, the effective maximum weight of the flexible chain 13 is 7.5 grams, and the weight of the moist material placed in the pan at the beginning of the test is 50 grams. With these values, the parts are so proportioned that, with the counter-weight in place, with 50 grams of moist material in the pan, and with the flexible chain 13 in its lowermost position, the pointer 31 will be in registry with the top of circle 10 as seen in Fig. 2. Also with these conditions the 0 of the graduations 9 will be in registry with the index line 30 because of rotation of knob 26 and shaft 11 to bring the flexible chain 13 to its lowered position.

When the knob 26 is rotated to bring the 0 of the graduations into registration with the index line 30, and with 50 grams of moist material, which is to be tested, in the pan (which as stated will place the pointer 32 in registry with the top of circle 10), the heating bulb 7 is next swung into central position over the pan and its contents. The automatic timing switch 23 is next set for the desired time, in this case three minutes, and the current turned on to the bulb. The heat from the bulb enters the moist material in the pan, and also heats the pan which conducts the heat to the bottom of the mass of material, thus driving the moisture out of the material and drying it. After a period of three minutes the current is automatically turned off. During this drying operation the moisture driven off from the material has correspondingly lessened the weight of the material, which causes the pointer 32 to rise to a higher level as indicated by the dotted lines 32' in Fig. 2. The knob 26 is then turned counter-clockwise which progressively raises the lower end of the flexible chain 13 and correspondingly lessens the weight on the rear end of the balance. This is continued until the pointer 32 descends into registry with the top of the circle 10, and the value of the graduation in line with the index line 30 is then read. This indicates the percentage of moisture that was driven off from the material in bringing it to a dry condition.

While a sprocket chain and sprocket wheels, driven by rotation of shaft 11, have been shown and described herein for illustrative purposes, it will be understood that other means rotated by shaft 11 may be utilized for decreasing and increasing the effective length of flexible chain 13, without departing from the spirit of the invention. When the 0 marking on the dial of disk 8 is in registry with index line 30, the balance is weighted with the counterweight 38 and the maximum weight of the flexible chain 13. The counterweight 38 is fixed in amount, but the effective weight of chain 13 with relation to the balance varies with the rotation of shaft 11 because of the raising and lowering of the free end of chain 13.

While other types of balance may be used, a torsion balance is preferred because it is rugged and has no knife edges or delicate bearings. The variations in the balancing load are readily obtained by the raising and lowering of the free end of the flexible chain 13, as the result of which different increments of load can be applied at will to the balance by rotation of the knob 26 and shaft 11. The dial disk 8 is calibrated according to the increment of weight on the balance or indirectly on the length of chain 13, which is effective in varying the weight on the balance. At the 0 position on the dial the maximum weight of the chain is applied to the beam of the balance. By turning the knob counterclockwise the length of the chain is shortened, which is equivalent to decreasing the applied weight.

The cabinet which encloses the torsion balance and variable weight mechanism is entirely enclosed except around the stem of the balance pan, thus protecting the inner parts against dust and dirt. The only parts which can be handled from the outside are the knob, the balance pan and the heating fixture. The dial is ordinarily calibrated for samples weighing 50 grams. For more bulky materials the dial could be calibrated for smaller initial weights. Furthermore, by using a lighter chain, the dial could be calibrated for lower maximum moisture percentages and consequently more accurate readings. By providing rapid heating and quick weighing, only a very short time is needed to obtain results.

While the present apparatus is especially adapted for the rapid and accurate determination of moisture in foundry sands, it may be used for determining the amount of moisture in other granular materials.

Having described the invention, I claim:

1. A moisture tester for ascertaining the amount of moisture in a given amount of material being tested, comprising, a cabinet having front, rear, top and bottom walls, a balance beam in said cabinet extending in a direction from near the rear wall to near the front wall, a stem articulated with the balance beam and extending upwardly through the top wall for free movement therethrough between the fulcrum of the balance beam and the front wall, a pan on said stem for holding the material to be tested, a constant counterweight on the other side of the fulcrum to balance the major load, a rotatable shaft extending between the rear wall and front wall and underneath the balance beam, a circular disk fixed to rotate with said shaft and positioned closely inside of the front wall, there being moisture percentage graduations around the outer edge of said disk, a window in the front wall through which said graduations may be successively read, a pointer on the front end of the balance beam, there being a concentric mark on the disk to indicate even balance when the pointer and concentric mark are in registry, a chain counterweight having one end fastened to the beam on the same end thereof as is said constant counterweight, and means operated by the shaft and connected with the chain for varying its effect upon rotation of the shaft, whereby the percentage of moisture dried out of the material being tested may be read on said graduations when the shaft has been rotated to bring the pointer and concentric mark into registry.

2. A moisture tester for ascertaining the amount of moisture removed by drying from a given amount of material being tested, comprising, a cabinet having front, rear and top walls, a balance beam in said cabinet and having a pointer on its front end adjacent the front wall, a window in the front wall adjacent said pointer, a sample pan above the top wall and supported on the front portion of the balance beam, a constant counterweight on the rear portion of the balance beam, a flexible chain fastened at one end to the balance beam on the same side as the counterweight, a shaft rotatably mounted in the front and rear walls and positioned below the balance beam, means operated by the shaft and connected to the flexible chain to raise and lower the opposite end thereof to vary the effective pull of the chain on the balance beam, a knob on the front end of the shaft outside of the front wall for rotating the shaft, a transparent circular disk fixed to the shaft to rotate therewith inside of the front wall, there being moisture-percentage graduations around the outer edge portion of the disk, an index line in the upper edge of said window, and there being a concentric mark on the disk, whereby when the pan contains a moist sample the pointer will register with the concentric mark, and when the sample has been dried the pointer will be above the concentric mark, and when the knob and shaft have been rotated to return the pointer into registry with the concentric mark, the graduation value on the disk in registry with the index line will represent the percentage moisture removed from the material by drying.

3. A moisture tester for ascertaining the amount of moisture removed by drying from a given amount of material being tested, comprising, a cabinet having front, rear and top walls, a balance beam extending from near the rear wall to near the front wall, a pointer on the front end of the balance beam, the front wall having a window opposite said pointer, an index line in the edge of the window, a sample pan above the top wall mounted on one side of the balance beam, a counterweight on the other side of the balance beam, a shaft below the balance beam and rotatably mounted in the rear and front walls, a light weight flexible chain secured at one end to the rear end of the balance beam and having a depending opposite end, a transparent disk fixed to said shaft adjacent the front wall, there being graduations on the edge portions of the disk, there being a mark on the disk concentric with the shaft, a manually operable knob on the front end of the shaft for rotating the shaft, and means on the rear end of the shaft and connected with the depending end of the chain for varying the weight of the chain on the balance beam, the pointer being above the concentric mark after the material has been dried, and rotation of the shaft will bring the pointer into registry with the concentric mark and the index line will register on said graduations the percent of moisture removed from the material sample.

4. A moisture tester as claimed in claim 3, in which said shaft extends beyond both ends of the balance beam and is parallel with the balance beam when the balance beam is in balanced position.

5. A moisture tester as claimed in claim 4, in which said means on the rear end of the shaft includes a sprocket wheel fixed to the shaft, and a sprocket chain running over said sprocket wheel and a smaller sprocket wheel journalled on the rear wall of the cabinet, the light weight flexible chain at its end removed from the balance beam being connected with the sprocket chain to be moved up and down therewith as the shaft is selectively rotated in one direction and the other.

6. A moisture tester for ascertaining the amount of moisture removed by drying from a given amount of material being tested, comprising, a cabinet having front, rear and top walls, a balance beam positioned between the front and rear walls and below the top wall, a sample pan above the top wall and mounted to and on one side of the balance beam, a counterweight and a light flexible chain mounted to and on the other side of the balance beam, the flexible chain depending from the beam, a shaft rotatably journalled in the front and rear walls, a knob on the front end of the shaft outside of the front wall, a transparent disk fixed to the shaft inside of the cabinet and having graduations on its outer edge portion, a pointer on the front end of the beam, there being a concentric mark on the disk, the beam being in balance with the pointer in registry with the concentric mark when a moist sample is in the pan, a pair of vertically spaced driven sprocket wheels rotatably mounted on the rear wall, a driving sprocket wheel fixed to the shaft to rotate therewith between said pair of sprocket wheels, a sprocket chain in driving engagement with said sprocket wheels, and the depending end of the first mentioned chain being fixed to the sprocket chain to move therewith when the shaft is rotated, to bring the pointer and concentric mark into registry when the sample is dry, whereby the amount of moisture removed from the sample may be read on the disk graduations.

HARRY L. CAMPBELL.

REFERENCES CITED

The following references are of record in the file of this patent:

UNITED STATES PATENTS

| Number | Name | Date |
|---|---|---|
| 262,907 | Roeder | Aug. 15, 1882 |
| 1,089,826 | Emerson | Mar. 10, 1914 |
| 1,258,009 | Jacobs | Mar. 5, 1918 |
| 2,373,056 | Seederer | Apr. 3, 1945 |

FOREIGN PATENTS

| Number | Country | Date |
|---|---|---|
| 604,863 | Great Britain | July 12, 1948 |
| 700,167 | France | Dec. 22, 1930 |